United States Patent
Rezvani et al.

(10) Patent No.: US 11,238,313 B2
(45) Date of Patent: Feb. 1, 2022

(54) AUTOMATIC DOCUMENT CLASSIFICATION USING MACHINE LEARNING

(71) Applicant: KYOCERA DOCUMENT SOLUTIONS INC., Osaka (JP)

(72) Inventors: Hooman Majidzadeh Rezvani, Pleasant Hill, CA (US); Andrii Matiukhov, Lafayette, CA (US); Takashi Oguma, Osaka (JP); Sang Lee, San Ramon, CA (US); Charles Henze, Pleasanton, CA (US); Hiroshi Manabe, Walnut Creek, CA (US); Christian Olmstead Holmes, Oakland, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/559,322

(22) Filed: Sep. 3, 2019

(65) Prior Publication Data
US 2021/0064866 A1    Mar. 4, 2021

(51) Int. Cl.
*G06K 9/62* (2006.01)
*G06K 9/00* (2006.01)
*G06N 20/00* (2019.01)

(52) U.S. Cl.
CPC ........ *G06K 9/626* (2013.01); *G06K 9/00469* (2013.01); *G06K 9/6254* (2013.01); *G06K 9/6267* (2013.01); *G06N 20/00* (2019.01)

(58) Field of Classification Search
CPC ... G06K 9/00442–00483; G06K 9/626; G06K 9/6254; G06K 9/6267–6287; G06K 9/00469; G06N 20/00
See application file for complete search history.

(56) References Cited

U.S. PATENT DOCUMENTS

| | | | |
|---|---|---|---|
| 9,477,756 B1 * | 10/2016 | Park | G06F 16/951 |
| 9,959,584 B1 * | 5/2018 | Frank | G16H 10/60 |
| 2006/0212142 A1 * | 9/2006 | Madani | G06K 9/6254 |
| | | | 700/49 |
| 2007/0237427 A1 * | 10/2007 | Patel | G06Q 40/02 |
| | | | 382/305 |

(Continued)

*Primary Examiner* — Casey L Kretzer
(74) *Attorney, Agent, or Firm* — GrowIP Law Group LLC

(57) ABSTRACT

Automatic document classification using machine learning may involve receiving inputs that assign documents to classifiers, which define document classification rules for a classification model. The computing device may train the classification model using a machine learning technique that assigns each document of a second set of documents to destinations based on the document classification rules. The computing device may also receive a template design for each destination that specifies metadata to extract for a document type corresponding to documents assigned to the destination. The computing device may subsequently classifying a particular document using the classification model, which may involve assigning the particular document to a given destination of the plurality of destinations based on the document classification rules, and exporting metadata from the particular document using the template design associated with the given destination.

20 Claims, 8 Drawing Sheets

(56) References Cited

U.S. PATENT DOCUMENTS

| | | | | |
|---|---|---|---|---|
| 2010/0257127 A1* | 10/2010 | Owens | ............ | G06N 7/005 |
| | | | | 706/12 |
| 2017/0237868 A1* | 8/2017 | Sato | ............ | G06K 9/00469 |
| | | | | 358/402 |
| 2019/0138829 A1* | 5/2019 | Gurghian | ............ | G06N 3/08 |
| 2020/0059419 A1* | 2/2020 | Miller | ............ | H04L 41/5096 |

* cited by examiner

AUTOMATIC DOCUMENT CLASSIFICATION USING MACHINE LEARNING

BACKGROUND

Automation is a major catalyst that can drive changes within many industries. In particular, an organization may develop a smart system configured to automate routine tasks, which could free up resources and increase efficiency. Until recently, only large organizations primarily had the resources available to develop technology to automate routines. A new generation of software solutions, however, may appear to be changing the costly development process enabling all sizes of organizations in various industries to implement smart systems that can be customized to perform tasks as desired. Such solutions can enable an organization to automate repetitive tasks, which can enable employees to focus resources on non-repetitive tasks.

SUMMARY

In one aspect, a method is provided. The method involves receiving, at a computing device and from a user interface, a set of inputs, where each input assigns a document of a first set of documents to a classifier of a set of classifiers such that the set of classifiers define document classification rules for a classification model. The method further involves training, by the computing device, the classification model using a machine learning technique that assigns each document of a second set of documents to a particular destination of a plurality of destinations based on the document classification rules. The method also involves receiving, at the computing device, a template design for each destination of the plurality of destinations, where each template design specifies metadata to extract for a document type corresponding to documents assigned to a destination. The method also involves subsequently classifying a particular document using the classification model. Classifying the particular document involves: (i) assigning the particular document to a given destination of the plurality of destinations based on the document classification rules, and (ii) exporting at least some metadata from the particular document using the template design associated with the given destination.

In another aspect, a system is provided. The system includes a user interface and a computing device. The computing device is configured to receive, from the user interface, a set of inputs, where each input assigns a document of a first set of documents to a classifier of a set of classifiers such that the set of classifiers define document classification rules for a classification model. The computing device is also configured to train the classification model using a machine learning technique that assigns each document of a second set of documents to a particular destination of a plurality of destinations based on the document classification rules. The computing device is further configured to receive a template design for each destination of the plurality of destinations, where each template design specifies metadata to extract for a document type corresponding to documents assigned to a destination. The computing device is also configured to subsequently classify a particular document using the classification model, where classifying the particular document involves: (i) assigning the particular document to a given destination of the plurality of destinations based on the document classification rules, and (ii) exporting at least some metadata from the particular document using the template design associated with the given destination.

In another aspect, an article of manufacture is provided. The article of manufacture includes non-transitory data storage storing at least computer-readable instructions that, when executed by one or more processors of a computing device, cause the computing device to perform tasks. The tasks include: receiving, from a user interface, a set of inputs, wherein each input assigns a document of a first set of documents to a classifier of a set of classifiers such that set of classifiers define document classification rules for a classification model; training the classification model using a machine learning technique that assigns each document of a second set of documents to a particular destination of a plurality of destinations based on the document classification rules; receiving a template design for each destination of the plurality of destinations, wherein each template design specifies metadata to extract for a document type corresponding to documents assigned to a destination; and subsequently classifying a particular document using the classification model, wherein classifying the particular document involves: (i) assigning the particular document to a given destination of the plurality of destinations based on the document classification rules, and (ii) exporting at least some metadata from the particular document using the template design associated with the given destination.

Other aspects, embodiments, and implementations will become apparent to those of ordinary skill in the art by reading the following detailed description, with reference where appropriate to the accompanying drawings.

DETAILED DESCRIPTION

Figure 1:
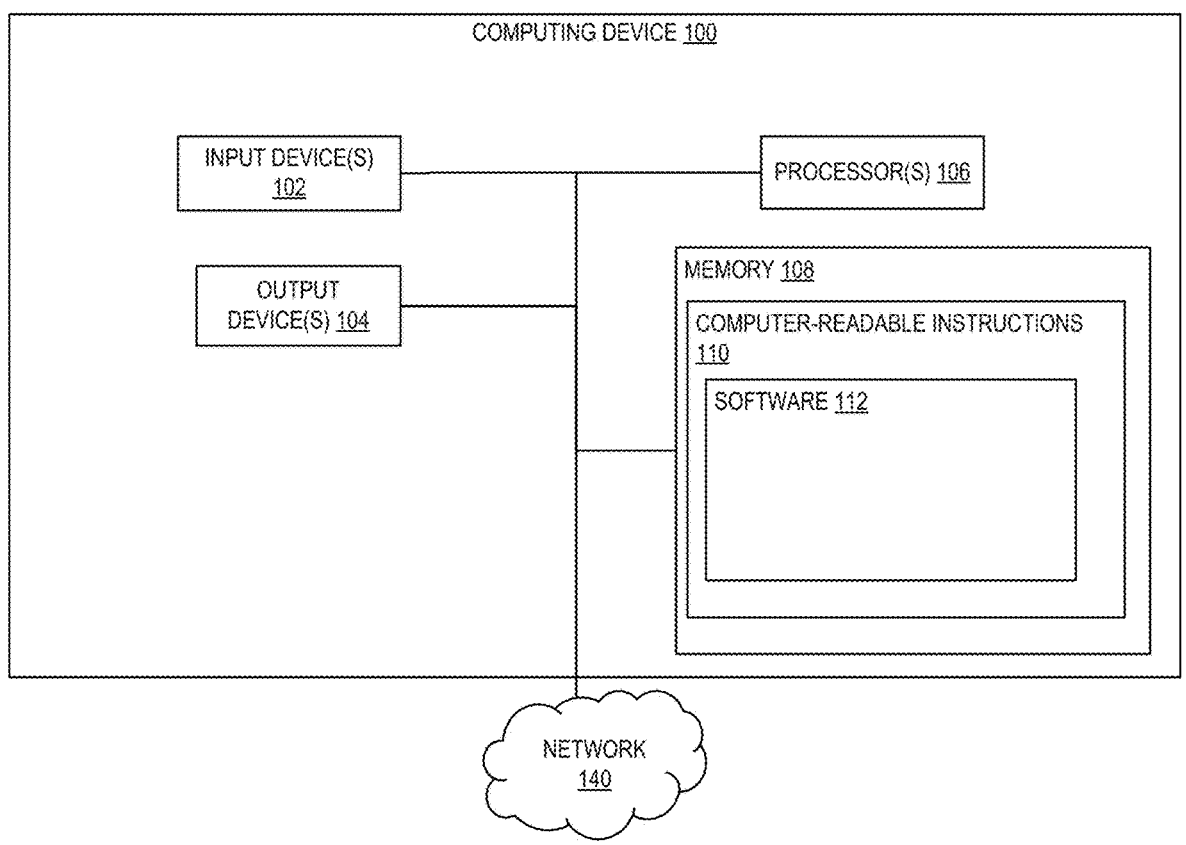
FIG. 1 is a schematic block diagram illustrating a computing device, in accordance with at least some example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Document classification generally involves classifying one or more types of documents based on document type. For example, a person may classify a group of documents by arranging the documents into one or more subgroups using one or more factors, such as information within each document, according to the sources that provided the documents, the particular structures of the documents, and/or the target receivers for the documents, among others. As such, various types of documents may be classified, including text-based documents (e.g., invoices), images, music, and other types of documents. As an organization grows, the quantity of documents requiring classification at the organization may become difficult to manage.

Described herein are techniques that relate to automatic document classification using machine learning. Machine learning is a technique that can involve analyzing data progressively to improve the performance of one or more tasks without requiring explicit programming to perform the task(s). Through iterations, machine learning can enable a computing system to "learn" how to perform a task effectively and efficiently, including document classification and information extraction. As such, example embodiments presented herein may involve printing devices and/or other types of computing devices using machine learning to classify and/or extract information from a wide array of document types, such as invoices, emails, identifications, contracts, and other forms. Machine learning can enable a device to efficiently manage, organize, and extract information from a large volume of documents with little to no user intervention. For instance, machine learning can be used to classify incoming documents by assigning one or more classes or categories to a document, which can make the documents easier to manage and sort.

Example embodiments may involve the development and use of a classification service that involves two aspects: (i) classification designer and (ii) classification task. Once developed, the classification service can be utilized by various types of devices, including computing devices, servers, and printing devices. For instance, a first device may be used to develop the classification service, which can be subsequently shared and executed by other devices.

For the classification designer aspect of the classification service, a device may provide an interface (e.g., a graphical user interface) that enables a user to create a classification model that can be used to classify documents. In particular, the classification model may enable a user to select and design one or more classifiers for the classification model to use when classifying documents. A classifier may correspond to an algorithm that implements the classification (e.g., maps input data to a category) for a set of similarly structured documents. For example, a user may select and configure a first classifier to classify invoices originating from Vendor A and a second classifier to classify invoices originating from Vendor B. As such, the device may also enable a user to upload one or more sample documents that can be used to train the classification model to learn how to identify and extract information from the sample documents and similarly structured documents. For instance, the user may provide the sample documents within emails and/or a web browser or mobile application and/or upload the sample documents to train the classification model.

Training may involve the classification model using machine learning and user input to learn how to analyze the different types of documents. More specifically, for each sample document (or type of sample document if multiples of the same type are used), a user may provide input that specifies particular information that the classification model should identify, extract, and use during classification. The information highlighted via a user input, also referred to herein as metadata, can include fixed data, such as an indication of a source of the document (e.g., a vendor identification (VAT ID)), and account information, etc. In addition, the classification model may use machine learning and/or user inputs to learn how to identify variable metadata within documents, such as amounts due, due dates, and invoice identification number, etc. The type of metadata extracted can vary depending on the type of document. As a result, the device may enable a user to customize the metadata extraction to ensure that the desired information is extracted. Thus, as shown, the classification model may be trained using machine learning and/or user inputs to learn how to classify various types of documents, including semi-structured documents.

Machine learning may also enable the classification model to learn how to classify documents based on similarities in structure of the documents. In some examples, machine learning may involve using a combination of metadata, structure, and/or prior user inputs to teach the classification model how to classify various types of documents.

Once a classification model is trained, the classification task aspect of the classification service can be executed. In particular, execution of the classification task may involve the creation of a workflow to classify a set of documents. For instance, a device may obtain multiple documents of one or more types (e.g., invoices, contracts) from one or more users. The device may receive the documents in various ways, such as via scanning physical versions of the documents and/or uploaded files containing the documents. Upon reception of one or more documents and a request from the user to perform the classification task, the device may classify the document(s) using the trained classification model such that the documents are organized and routed to particular destinations as defined in the classifiers used by the model. Particularly, the device may route the documents into different folders and/or other destinations (e.g., email addresses or printers for printing) according to the mappings provided by the classifiers used by the classification model.

Classification of documents during the classification task may involve the classification model using one or more optical character recognition (OCR) templates designed to identify and extract information from particular types of documents. More specifically, one or more OCR templates may be associated with a classifier used by the classification model to enable the character recognition and extraction of metadata from the documents. This extraction process can further enable routing the documents to target destinations (e.g., a set of folders) as well as organization and presentation of the information within the documents.

As an example, an OCR template may be designed and use for each vendor providing invoices to an organization (e.g., a first OCR template for vendor A and a second OCR template for vendor B). In some examples, the device may use metadata (e.g., a vendor ID) to obtain additional information to supplement the metadata extracted from a document. For instance, the device may use a source identification to obtain an address and other information regarding the source from a database. The additional information can be provided with the extracted information to further inform a user.

In some instances, the classification model may fail to classify a document during performance of the classification task. In such a case, the device may notify a user via an email or another form of notification (e.g., message). The notification may include a link that enables the user to classify the document manually. Using the manual classification, the classification model may learn how to subsequently classify similar documents. In some examples, the device may route the unclassified documents to a particular folder for subsequent review by a user. In addition, the classification service may provide logs during training and classification that enable user review of operations. Particularly, a user may check to see the accuracy of the training and classification according to the logs, identify potential documents that may require retraining the classification model, and/or perform other actions to verify operations are performed as desired.

In some examples, a classification service may use one or more classification models, which may each include a number of classifiers. One or more of these classification models may depend on a ratio of the number of sample documents to the number of words within each sample document during training. For example, if the ratio of samples to number of words per sample is less than a predefined threshold (e.g., one sample to one thousand words), multilayer perceptron (e.g., a technique using two-three layers) may be used with "n-gram if-idf" as features extraction with top k features and using one or more regularization techniques like dropout. In other examples, word embedding and separable convolutions may be used.

In addition, various types of machine learning techniques may be used to train one or more classification models. For instance, artificial neural networks, decision trees, support vector machines, and Bayesian networks are all example techniques that may be used to train a classification model.

To illustrate another example, a printing device may access and use a classification service designed to classify phone bill invoices for an organization. For instance, the printing device may enable a user to create and train the classification service via an interface of the printing device and/or the printing device may obtain the classification service from another computing device. As such, the classification model of the service may use a different classifier for each network vendor to classify the phone bill invoices according to network vendors (e.g., invoices from Vendor A are sent to folder A and invoices from Vendor B are sent to folder B). Each classifier may include an OCR template that is designed to extract particular information from each document, such as metadata related to the vendor, amount due, due date, and invoice number. The device may classify and provide extracted information in an organized format (e.g., a CSV file) for user review as well as store the invoices in folders arranged according to vendors (e.g., a first folder for Vendor A, a second folder for Vendor B).

II. Computing Device and Printing System Examples

FIG. 1 is a schematic block diagram illustrating computing device 100, in accordance with at least some example embodiments. In some embodiments, computing device 100 can be configured to perform at least part of the herein-described procedures and techniques for classifying documents using machine learning. Computing device 100 can include one or more input devices 102, one or more output devices 104, one or more processors 106, and memory 108. In other examples, computing device 100 can include more or fewer components in other arrangements.

Input devices 102 can include user input devices, network input devices, sensors, and/or other types of input devices. For example, input devices 102 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140 and/or wireless network receivers and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of network 140.

Sensors can include devices configured to measure conditions in an environment of computing device 100 and provide data about that environment, such data including, but not limited to, location data, velocity (speed, direction) data, acceleration data, and other data about the environment for computing device 100. Example sensors include, but are not limited to, GPS sensor(s), location sensors(s), gyroscope (s), accelerometer(s), magnetometer(s), camera(s), light sensor(s), infrared sensor(s), and microphone(s). Other input devices 102 are possible as well.

Output devices 104 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices.

Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140 and/or wireless network transmitters and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infrared or ultra-violet light. Other output devices 104 are possible as well.

Processors 106 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 106 can be configured to execute computer-readable instructions 110 that are contained in memory 108 and/or other instructions as described herein.

Memory 108 can include one or more computer-readable storage media configured to store data and/or instructions that can be read and/or accessed by at least one of processors 106. The one or more computer-readable storage media can include one or more volatile and/or non-volatile storage components, such as optical, magnetic, organic or other memory or disc storage, which can be integrated in whole or in part with at least one of processors 106. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 108 can be implemented using a single physical device (e.g., one optical, magnetic, organic or other memory or disk storage unit), while in other embodiments, memory 108 can be implemented using two or more physical devices.

In particular, memory 108 can store computer-readable instructions 110 that, when executed by one or more of processor(s) 106, can cause a computing device to perform functions, such as but not limited to, functions related to herein-described procedures, techniques, devices, networks, methods, features, and/or scenarios. In some embodiments, computer-readable instructions 110 can include at least instructions for document classification software 112. Document classification software 112, when executed by processors 106 of computing device 100, provides instructions to computing device 100 to carry out part or all of the methods described herein, and/or provide some or all of the functionality described with respect to example scenarios. In some embodiments, computer-readable instructions 110 and/or document classification software 112 can include at least instructions to carry out at least part of the herein-described functionality of a node, a scanning/printing device, and/or a computing device. In some examples, document classification software 112 may include one or more classification services that enable the training and use of a classification model to classify and extract information from documents. Document classification software 112 may include one or more machine learning algorithms.

As shown in FIG. 1, computing device 100 may be connected to one or more other computing devices via network 140. As such, computing device 100 may transfer files and/or other information with other devices via network 140. For instance, computing device 100 may send one or more trained classification models to one or more devices for use via network 140 and/or receive one or more trained classification models from one or more devices via network 140. This way, classification models may be shared between different devices enabling a classification model to be trained at one device and used by numerous other devices.

Figure 2:
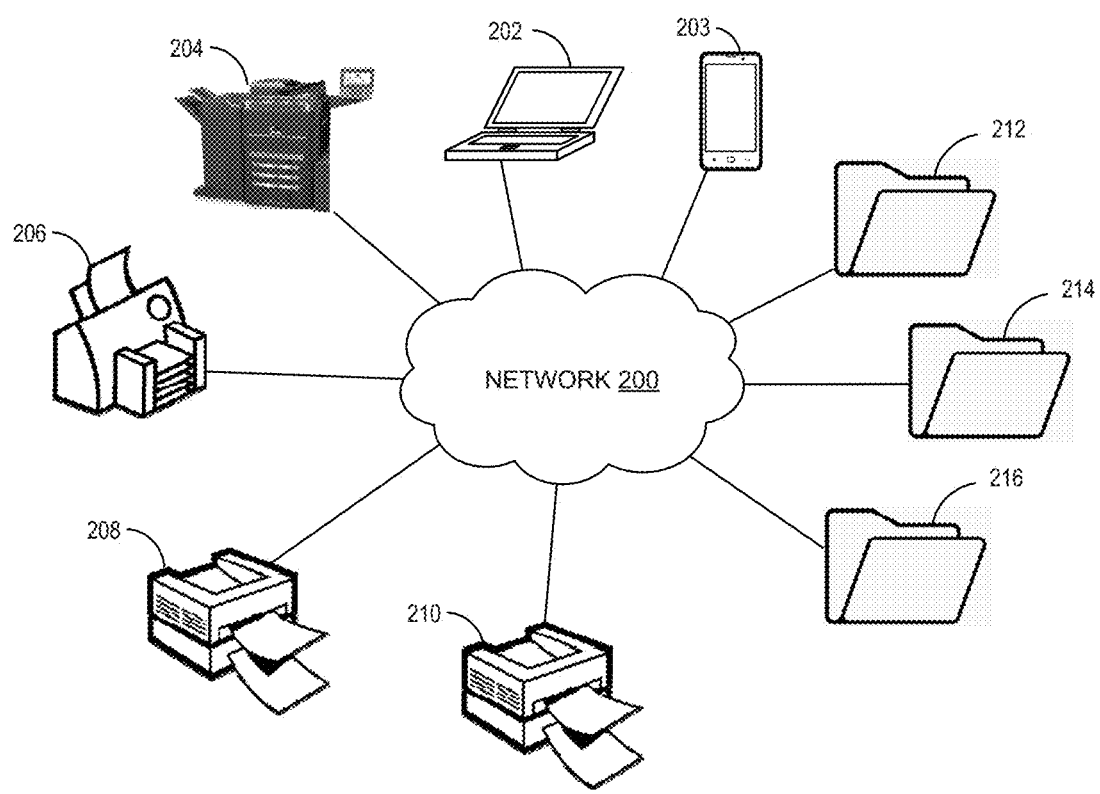
FIG. 2 is a diagram illustrating a network, in accordance with at least some example embodiments.

FIG. 2 is a diagram illustrating network 200, in accordance with at least some example embodiments. Network 200 includes computing device 202, mobile device 203, printing devices 204, 206, 208, 210, and target destinations 212, 214, 216. In some examples, network 200 can have more, fewer, and/or different types of devices than indicated in FIG. 2.

Computing device 202 may be implemented as computing device 100 shown in FIG. 1. As such, computing device 202 may represent one or more computing devices that can create, obtain, update, display, and/or delete data (and perhaps related software) for configurations of network 200. Example data for configurations of network 200 includes, but is not limited to: data for configuring devices in network 200; e.g., data for scanning/printing devices 210, 212, 214, 216, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS™), Simple Message Transfer Protocol (SMTP), SNMP, Transfer Control Protocol/Internet Protocol (TCP/IP), User Datagram Protocol (UDP), Lightweight Directory Access Protocol (LDAP), MQ, and/or other protocols), access-management related data for clients and/or servers; (e.g., passwords, signatures, credentials, certificates, subscriptions, licenses, and/or tokens related to accessing part or all of the functionality of network 200 and/or cloud-based services, software and/or solutions) and data for customizing, configuring and managing applications on devices/servers of network 200.

In some examples, a user may utilize computing device 202 to perform one or more operations described herein. For instance, a user may use computing device 202 to create a single scan workflow for one or more types of semi-structured documents. The workflow may be operated by one or more devices (e.g., printing devices 204-210) connected via network 200. The computing device 202 may enable the user to create zone OCR templates for each semi-structured document type as well as other types of documents. The workflow may enable automatic classification of documents using machine learning.

Mobile device 203 may represent various types of mobile devices, such as mobile phones and wearable computing devices, among others. As such, mobile device 203 may perform operations described herein, including operations described with respect to computing device 202 and printing devices 204, 206, 208, 210.

Printing devices 204, 206, 208, 210 can include components configured to perform one or more operations, such as scan, print, copy, e-mail, account for, communicate and/or otherwise process documents and/or files that are originally available either on paper or electronically. For example, some or all of printing devices 204, 206, 208, 210 can include scanning components for creating electronic copies of original paper documents and/or for generating electronic data via OCR or other techniques from the original paper documents. After processing by one or more of printing devices 204, 206, 208, 210, the paper-form data, documents, and/or files can be subsequently available either on paper or electronically, as requested.

A document box can be storage allocated to an entity (e.g., a user, an administrator, a company, another type of entity) on a printing device, a scanning/printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 204-210 can perform other tasks and/or other processing as well. As such, printing devices 204-210 can include products from various manufacturers with variations in color, speed, computing power, functionality, network connectivity, and/or other features.

In some examples, some or all of printing devices 204-210 can be connected to network 200 through one or more, possibly different, network protocols. Data can be transmitted between printing devices 204-210, computing device 202, target destinations 212, 214, 216, and/or wireless links between computers, computing devices, nodes, printing devices, scanning/printing devices, servers, and network 200. The format of each respective data transmission between devices in network 200 can include one or more of a variety of different formats including: text formats, image formats, extensible mark-up language (XML), Simple Network Maintenance Protocol (SNMP) formats, database tables, text including OCR'd text, a flat file format, or another format.

In some embodiments, one or more additional computing devices, e.g., one or more servers, nodes, and/or other computing devices, can be used in network 200 to perform additional functions, such as functions for one or more document solutions and managed print services, prediction-related functions, act as databases, provide machine learning functionality, and other functions.

Target destinations 212, 214, 216 represent potential destinations for routing classified documents. Particularly, a device (e.g., computing device 202, mobile device 203, printing devices 204-210) may use a classification service to classify and route documents into target destinations 212, 214, 216. For instance, the device may automatically classify a set of invoices into target destinations 212, 214, 216 based on vendor. In some examples, target destinations 212, 214, 216 may also include one or more files that correspond to data extracted from one or more documents classified via the classification model.

III. Document Classification Workflow Examples

Figure 3:
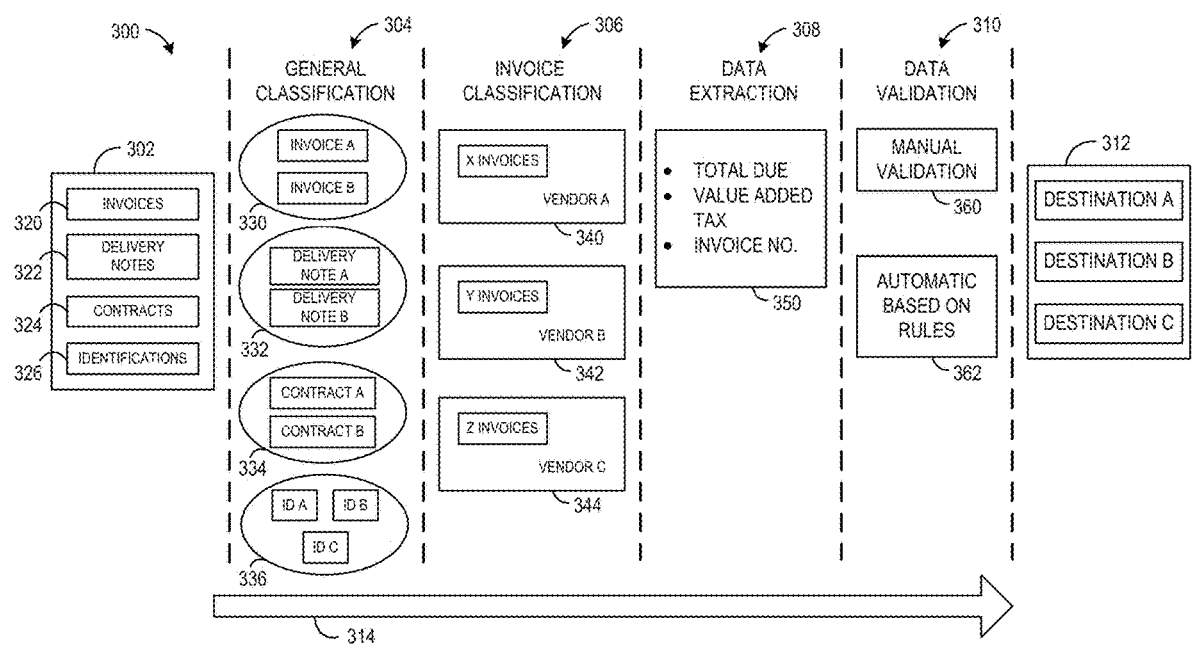
FIG. 3 illustrates a document classification workflow, in accordance with at least some example embodiments.

FIG. 3 illustrates a document classification workflow, in accordance with at least some example embodiments. Document classification workflow 300 includes inputs 302, general classification 304, invoice classification 306, data extraction 308, data validation 310, and output 312. A computing device (e.g., computing device 100, computing device 202, mobile device 203 printing devices 2040-210) may enable performance of one or more of the aspects of document classification workflow 300.

Inputs 302 include different types of documents that can be analyzed for classification. As shown, example inputs may include one or more invoices, delivery notes, contracts, and identifications. Other types of documents may be classified within examples. For instance, an organization may receive and classify organization-specific documents.

General classification 304 represents a process that may involve classifying inputs 302 into general groups. As shown in FIG. 3, invoices (e.g., invoice A and invoice B) are grouped into invoice group 330, delivery notes (e.g., delivery note A and delivery note B) are grouped into delivery group 332, contracts (e.g., contract A and contract B) are grouped into contract group 334, and identifications (e.g., ID A, ID B, and ID C) are grouped into identification group 336.

Document classification workflow 300 further shows invoice classification 306, which involves arranging invoice group 330 into subgroups 340, 342, 344 based on differences in vendors. Particularly, subgroup 340 includes X invoices that correspond to vendor A, subgroup 342 includes Y invoices that correspond to vendor B, and subgroup 344 includes Z invoices that correspond to vendor C. In addition, although not shown in FIG. 3, document classification workflow 300 may further classify the other types of documents, such as delivery notes, contracts, and identifications.

Data extraction 308 involves one or more devices extracting data from the invoices. Particularly, data extraction 308 may involve extracting information from each invoice for subsequent routing to a particular destination. Data extraction 308 may be based on OCR template scans and/or other techniques that can identify information within each invoice for extraction.

Data validation 310 may involve validating the data extracted during data extraction 308. In some instances, manual validation 360 may be used. This may involve the device requesting manual approval from a user for one or more documents via an interface. Automatic validation based on predefined rules 362 may be performed by one or more computing devices.

Output 312 includes different destinations, such as destination A, destination B, and destination C. These destinations may be located at the device performing document classification workflow 300 and/or at one or more remotely positioned devices (e.g., a server).

Figure 4:
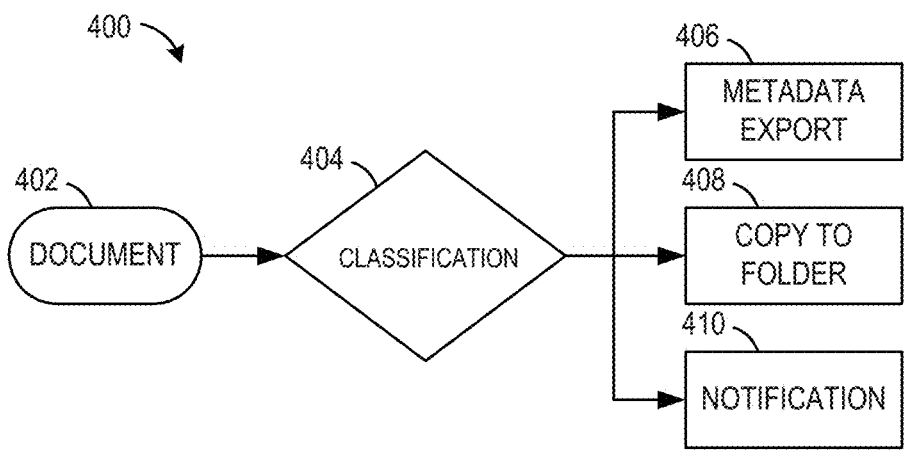
FIG. 4 is a flowchart for automatic document classification, in accordance with at least some example embodiments.

FIG. 4 is a flowchart for a method, in accordance with at least some example embodiments. Method 400 represents a classification task that can be carried out by a computing device, such as computing device 100 shown in FIG. 1 or computing device 202 and/or printing devices 204-210 shown in FIG. 2. Method 400 can also be carried out by a remotely positioned device, such as a server. For instance, a printing device may communicate with the server that performs one or more blocks of method 400.

Block 402 of method 400 involves obtaining a document 402. Particularly, a device may obtain the document from a user via an upload or a transfer (e.g., an email). For instance, a user may provide documents to the device via emails, links to folders, mobile application uploads and/or dragging and dropping on a web browser.

In some examples, a device may use machine learning to extract documents from sources, such as accessing invoices or other documents within email messages upon prior approval from a user. Similarly, the device may use machine learning to identify and access documents from folders, mobile applications, and web browsers.

Block 404 of method 400 involves classifying the document. A trained classification model may identify and use a classifier that classifies the document based on metadata within the document. Metadata within the documents may include data that describes and gives information about other data, such as vendor identification (e.g., a VAT ID) or type of document. The classification model may use machine learning and one or more OCR templates to extract information to classify the document.

As shown, classifying the document may subsequently lead to one or more options represented by blocks 406, 408, and 410. Block 406 of method 400 involves exporting metadata 406. During block 406, the device may perform an OCR scan of the document using an OCR template to extract metadata. In particular, the metadata may include information that a user previously designed the OCR template to extract.

Block 408 of method 400 involves copying to a folder. The device may copy the entire document to a folder designated for the documents and similar documents. Particularly, the folder may be selected to store documents from the same source (e.g., same vendor), documents related to the same project, documents that share a due date, and/or other parameters. In some instances, the folder may be user defined. In other instances, the device may automatically generate one or more folders for storing documents after classification.

Block 410 of method 400 involves providing a notification. The notification can provide different information within examples. In some instances, the notification may indicate to one or more users that the document was not classified by the device. For instance, the classification model may fail to classify the document causing the device to provide the notification. As such, the notification may take the form of a message, email, and/or some other format that can notify the classification failure. In some examples, the notification may include a link that enables the user to manually classify the document. In response to a manual classification, the classification model may learn to subsequently automatically classify similar documents based on the manual classification. For instance, the classification model may generate and/or associate a new classifier with documents similar to the manually classified documents. Similar documents may have similar metadata (e.g., same vendor and type) and/or similar structure (e.g., similar information positioned in the same general format on the document).

To further illustrate an example, a device may process an invoice received via an email. Particularly, the device may initially access the invoice within the email and classify the invoice based on metadata within the invoice. In some examples, the classification model may classify the document based on a structure of the document. For instance, a classifier may analyze the arrangement of metadata on the document without text recognition to classify the invoice with a particular vendor if the particular vendor consistently uses a structure that is unique apart from other vendors. In addition, the classification may use an image analysis to classify the invoice.

In other examples, the classification model may classify the document based on analyzing metadata from the document. For instance, the classification model may determine the vendor that provided the document based on text recognition. The classification model may also use a combination of aspects of the document to classify the document.

Classifying the invoice may involve subsequently performing one or more tasks, such as storing the document with similar invoices (or documents), extracting and exporting metadata from the invoice, and/or providing a notification regarding the invoice. In particular, storing the invoice may involve associating the invoice with a folder that is designated to hold the invoice and other documents based on a shared aspect, such as a common provider of all the documents, a common due date (e.g., all documents are invoices owed on the same date), or another aspect (e.g., each document is associated with a particular department of an organization).

In some instances, the device may store a portion of the metadata within a folder as a file. As such, the device may export metadata using machine learning to provide metadata as a CSV file for review by a user. In some examples, the device may associate extracted information with additional information obtained from a database, such as information about vendor that sent the invoice (e.g., an address and a description of the vendor). For instance, the device may use a fixed value for the invoice (e.g., a VAT ID) to obtain information about the vendor from the database.

The metadata selected for exporting can depend on previous selections from a user. Particularly, the metadata could be selected based on a template designed by a user for that type of invoice. Similarly, the device may identify some of the metadata using machine learning that analyzes metadata extracted from other documents, such as invoices from other vendors. In some examples, the device may use a combination of machine learning and prior user inputs to identify and extract metadata from the invoice for exporting.

The device may also provide a notification regarding the invoice. The notification may indicate the successful classification and extraction of metadata from the invoice. In other instances, the notification may signal that the classification was a failure and may further request for manual validation of the invoice by the user. For instance, a link may be provided within an email that can enable a user to validate (e.g., classify and/or select metadata to extract) via the touchscreen interface of a smartphone. In some examples, the device may determine an accuracy rate and notify the user in situations where the accuracy rate falls below a threshold accuracy rate.

IV. User Interface Examples

Figure 5A:
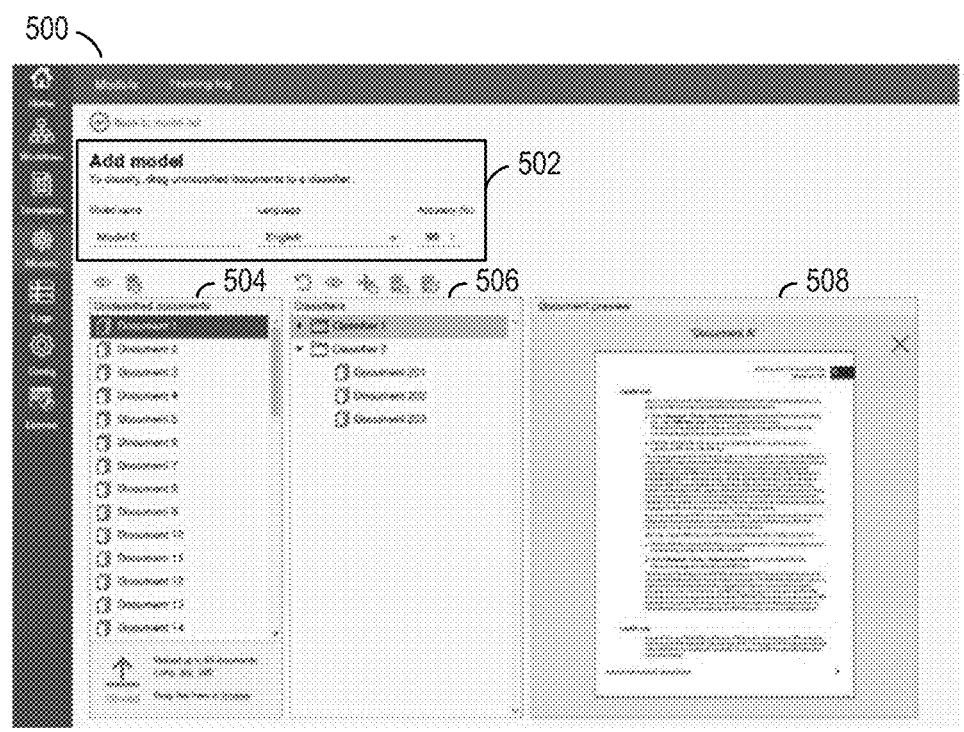
FIG. 5A shows a user interface for training a classification service, in accordance with at least some example embodiments.

FIG. 5A shows a user interface for training a classification service, in accordance with at least some example embodiments. User interface 500 may be provided by a device to enable a user to train a classification model. As shown, user interface 500 includes add model option 502, unclassified documents section 504, classifiers section 506, and document preview 508. User interface 500 may include other elements and can have other arrangements within other examples. In addition, user interface 500 may enable a user to customize the arrangement and sections included within user interface 500.

Add model option 502 may include one or more features that enable a user to create and/or modify a classification model. Once created, the classification model can be used by one or more devices to classify documents as set up by the user with enhancements provided via machine learning. As shown in FIG. 5A, add model option 502 includes a naming option, a language option, and an accuracy percentage option. The naming option can allow a user to provide a name to a newly created classification model and/or modify the existing classification model. In some examples, user interface 500 may provide a default name (e.g., Model E) that a user can optionally change. The language option allows a user to adjust the language of the classifier. For instance, adjusting the language may change the type of language that the classifier analyzes. In some examples, adjusting the language may also enable an adjustment of the language used for user interface 500.

Unclassified documents section 504 may correspond to an uploading area that a user can use to upload documents to train the classification model being created and/or modified. As shown in the example, unclassified documents section 504 may show titles of documents uploaded via unclassified documents section 504. User interface 500 includes an option to view and delete these documents once uploaded to unclassified documents section 504. This option is represented by the eye symbol and the trashcan positioned proximate unclassified documents section 504.

Classifiers section 506 may include classifiers added by a user via an addition option associated with classifiers section 506. A classifier may enable mapping documents to particular folders or other target destinations. As shown in FIG. 5A, "classifier 1" is shown as a folder that a user can assign sample documents to "classifier 1" to train the classification model to learn how to subsequently route similar documents to the sample documents placed in "classifier 1". In addition, "classifier 2" as well as other classifiers can be added and trained to route particular documents based on the sample documents placed within each classifier. Classification section 506 also includes other options, such an undo option (e.g., undo last assignment option), a preview a document option or a set of documents assigned to a classifier, a delete a classifier option, and a delete one or more documents option.

Document preview 508 may correspond to an area where any document selected for a preview by the user may be shown. This may enable a user to review each unclassified document by clicking on the document, which can further allow the user to decide which classifier to assign each unclassified document to. In addition, document preview 508 can be used to review documents placed into each classifier.

Figure 5B:
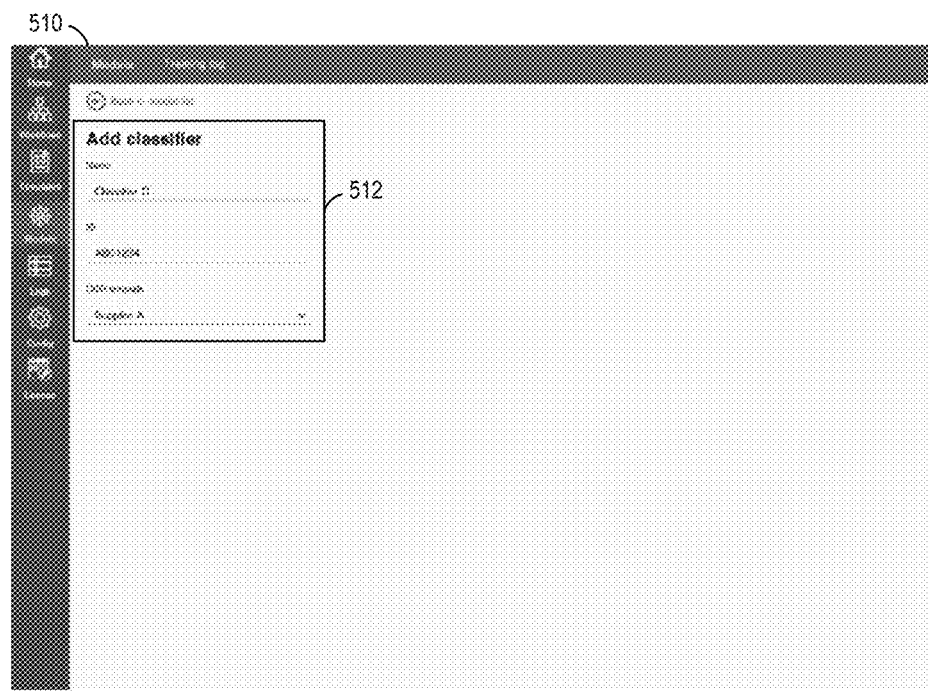
FIG. 5B shows a user interface for adding a classifier for a classification model, in accordance with at least some example embodiments.

FIG. 5B shows a user interface for adding a classifier, in accordance with at least some example embodiments. User interface 510 may be provided by a device to enable a user to train a classification model and may be provided as an option relative to user interface 500 shown in FIG. 5A. As shown, user interface 510 includes add classifier section 512. User interface 510 may include other elements and can have other arrangements within other examples. In addition, user interface 510 may enable a user to customize the arrangement and sections included within user interface 510.

Add classifier section 512 includes a name option, ID, and OCR template. A user may use add classifier section 512 to create a new classifier for a classification model (e.g., the classification model shown in FIG. 5A). Name option may enable a user to name the classifier. User interface 512 may provide a default name (e.g., Classifier D) that a user can change. ID may indicate a character set for the classifier to use. Alternatively, ID may provide a unique identification for the classifier that can be used to search for the classifier. OCR template enables a user to select an OCR template to assign to the classifier. For instance, OCR template may be associated with particular sources of documents (e.g., supplier A) and may utilize a drop down feature to display available OCR templates. A user may design these templates using documents via another user interface associated with user interfaces 500, 512.

Figure 6:
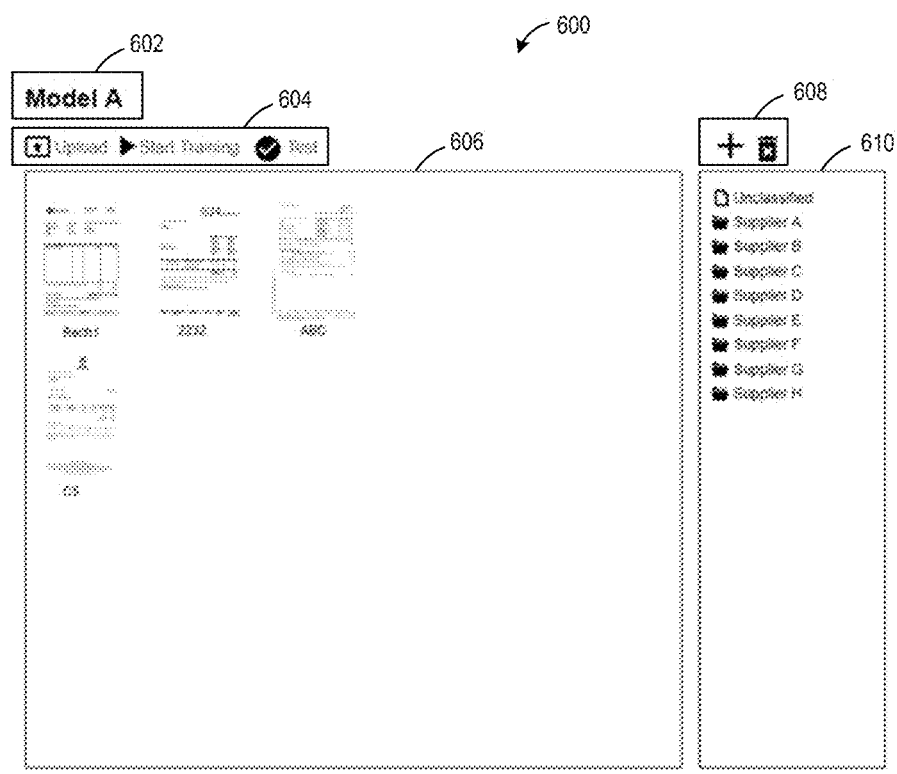
FIG. 6 shows a user interface for training a classification model, in accordance with at least some example embodiments.

FIG. 6 shows a user interface for training a classification model, in accordance with at least some example embodiments. User interface 600 includes model name 602, operation options 604, document section 606, add or delete options 608, and target destination section 610. Model name 602 may convey the name of the classification model being trained via user interface 600.

Operation options 604 represent selectable icons that a user may select to perform different tasks, such as upload documents for training the classification model. A user may drag documents into document section 606 to upload documents for training. Operations options may also include a start training option to enable a user to initiate training of the classification model using documents within documents section 606. In addition, test may enable a user to test the classification model using one or more documents and showing results.

Add or delete options 608 can enable documents to be deleted or added to documents section. In addition, add or delete options 608 may enable adding or removing target destinations from target destination section 610.

When training is performed via user interface 600, the classification model may use machine learning to analyze and classify the documents within document section 606 according to the classifiers added to the classification model by the user. Machine learning may involve extracting and comparing some metadata within a document relative to metadata of documents within the different classifiers of the classification model. Text may be extracted via OCR templates associated with the classifiers.

In some cases, the classification model may be unable to classify some documents and assign these unclassified documents to a separate folder for user review. A user may manually classify these documents, which in turn further provides additional data used by machine learning to enhance the automatic classification by the model. Thus, increasing the quantity of sample documents used to train the classification model may increase the accuracy of the classification model and/or the variety of document types that the classification model can classify.

V. Methods of Operations Examples

Figure 7:
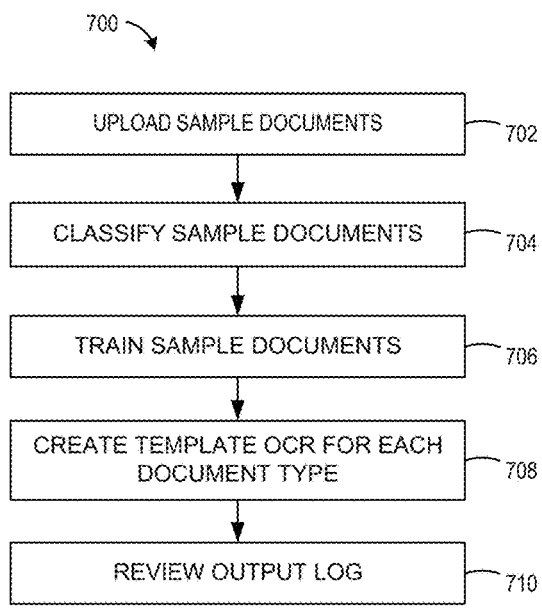
FIG. 7 is a flowchart of a method, in accordance with at least some example embodiments.

FIG. 7 is a flowchart of method 700, in accordance with at least some example embodiments. Method 700 can be carried out by a computing device, such as computing device 100 shown in FIG. 1 or computing device 202 and/or printing devices 204-210 shown in FIG. 2. Method 700 can also be carried out by a remotely positioned device, such as a server. For instance, a printing device may communicate with the server that performs one or more blocks of method 700.

Method 700 may represent an example method that an administrator or another type of user may perform using a device, such as the above devices. Particularly, the administrator may perform method 700 to prepare a classification model to classify documents autonomously. In some examples, a device may be used to perform a subset of the blocks shown in method 700.

Block 702 of method 700 may involve uploading sample documents. The computing device may receive and upload a quantity of sample documents. The quantity of sample documents can vary within examples. For example, the device may obtain a set of two or more sample documents (e.g., 10, 30, or 50 documents).

In some examples, an administrator may provide a set of sample documents to a printing device using file transfers (e.g., email the set to the printing device) and/or scanning the set of sample documents). In some instances, the printing device may communicate the sample documents to a server for subsequent analysis.

Block 704 of method 700 may involve classifying the sample documents. The device (or a remotely positioned computing device (e.g., a server)) may provide an interface that enables classification of each sample document. The interface may allow the administrator to choose sample documents and specify a classifier to use with the documents. For example, the administrator may select a first classifier to be used with a first set of one or more sample documents and a second classifier to be used with a second set of one or more other sample documents.

The device may generate a log of the results of the classification. The device may display the log on a display interface (e.g., a user interface). In some examples, the log may include a variety of information related to the classification. For instance, the information may include a date and time of the classification, an elapsed time to perform the classification, a model indication (e.g., Model A or Model 1), the results of the classification and a corresponding accuracy, and links to any documents that the device failed to classify effectively. In addition, the log may also include other information that an administrator can use to retrain the classification model.

Block 706 of method 700 may involve training sample documents. The device may display each sample document and enable a user (e.g., the administrator) to train the classifier for the sample document. Training may involve the user selecting elements of the sample document that the classifier should "learn" to extract information from. Particularly, the classifier may be trained based on inputs from the administrator on which elements of the sample document to extract information from.

In some examples, the device may generate and display a corresponding training log that can show actions made during training. Particularly, the training log may be displayed on a display interface (e.g., a user interface). The training log may include a variety of information related to the training. For instance, the information may include a status of training (e.g., completed, partially completed, or currently training), a date and time when the training was started, elapsed time for the training (when the training is completed), a modifiable model name, a number of classifiers, a number of sample documents used for the training, and other information that can enable an administrator to retrain for the particular document type.

In addition, method 800 may further involve scheduling training. Particularly, the device may enable the administrator to specify when the device (or another computing device) should execute training and train one or more classifiers using one or more sets of sample documents. The device may enable scheduling during a particular time, such as when the device is not likely in use (e.g., at night).

Block 708 of method 700 may involve creating a template for optical character recognition (OCR) for each document type. Based on the training, the device may create a template OCR for each document type. OCR may involve the electronic conversion of images of typed, handwritten or printed text into machine-encoded text. For instance, each template OCR may be applied to subsequently extract information from documents similar to the sample documents used to train the classifiers. Thus, the classifiers may help organize documents for subsequent information extraction using the template OCRs.

Block 710 of method 700 may involve reviewing the output logs produced by the device. Particularly, the device may display the logs on a display interface for the administrator to review, save, store, and/or for other actions. The logs may be used to determine which classifiers were trained properly and which classifiers may need further review and/or retraining.

In some examples, a device may be used to enable an administrator to create a workflow where invoices are classified. Using one or more steps of method 600, the administrator may prepare the device (or other devices) to subsequently scan an invoice enabling a OCR scan to extract data from the invoice and export the data to a particular destination in a given format (e.g., a Comma-separated value (CSV) file).

In some examples, a device may be used to enable a user to create a workflow for classifying a set of documents. As a result, the device may enable subsequent users to scan documents at the device or send documents to the device and have the device automatically classify and route the documents to appropriate destinations (e.g., documents that are type A are sent to a folder A and documents that are type B are sent to a folder B).

In some examples, a device may be used to scan multiple invoices from a client. The device may be configured to classify the invoices and use a template OCR scan to extract data from the invoices. The device may then export the data in one or more file types. In addition, when one or more of the invoices corresponds to a document type that has not yet been classified the device may provide a notification (e.g., email, alert) to one or more users indicating that manual classification may be needed. The user may open the notification and verify the unclassified document. For instance, the user may remotely train the device how to classify the document, which may include training the device which information to extract from subsequent documents having a similar format.

Figure 8:
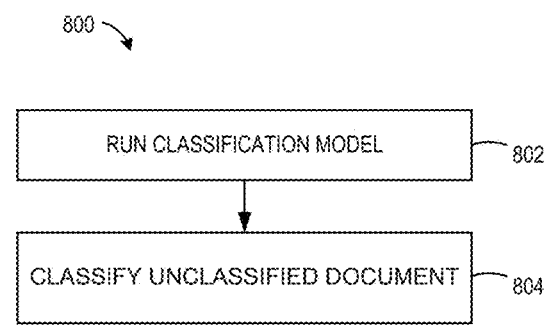
FIG. 8 is another flowchart of a method, in accordance with at least some example embodiments.

FIG. 8 is a flowchart of method 800, in accordance with at least some example embodiments. Similar to method 800 shown in FIG. 8, method 800 can be carried out by a computing device, such as computing device 100 shown in FIG. 1 or computing device 202 and/or printing devices 204-210 shown in FIG. 2. Method 800 can also be carried out by a remotely positioned device, such as a server. For instance, a printing device may communicate with the server that performs one or more blocks of method 800.

Method 800 may represent an example method that a user may perform using a device, such as one or more of the above devices. Particularly, the user may perform method 800 to enable a device (e.g., a printing device) to classify documents autonomously. In some examples, a device may be used to perform a subset of the blocks shown in method 800.

Block 802 of method 800 may involve running a classification model. Particularly, a user may provide one or more documents to a classification model, which may be implemented across one or more devices. For example, the user may upload documents, such as contracts, invoices, and identifications. In some examples, the user may select a particular model to perform classification of the documents.

Block 804 of method 800 may involve classifying one or more unclassified documents. The user may manually classify one or more of these unclassified documents using an interface of the device to further train the classification model how to classify similar documents in future instances.

Figure 9:
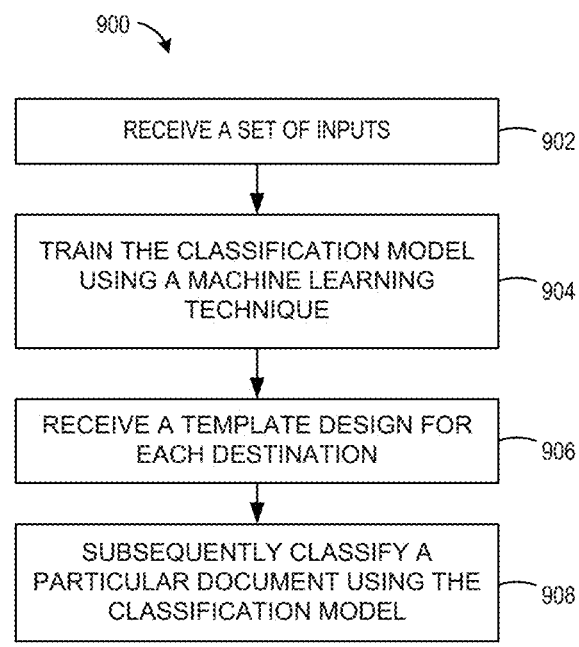
FIG. 9 is yet another flowchart of a method, in accordance with at least some example embodiments.

FIG. 9 is a flowchart of method 900, in accordance with at least some example embodiments. Similar to method 900 shown in FIG. 9, method 900 can be carried out by a computing device, such as computing device 100 shown in FIG. 1 or computing device 202 and/or printing devices 204-210 shown in FIG. 2. Method 900 can also be carried out by a remotely positioned device, such as a server. For instance, a printing device may communicate with the server that performs one or more blocks of method 900.

Method 900 may represent an example method that a user may perform using a device, such as one or more of the above devices. Particularly, the user may perform method 900 to enable a device (e.g., a printing device) to classify documents autonomously. In some examples, a device may be used to perform a subset of the blocks shown in method 900.

Block 902 of method 900 may involve receiving a set of inputs. For instance, a computing device (e.g., a printing device) may receive a series of inputs via user interface from a user. Each input may assign a document of a first set of documents to a classifier of a set of classifiers such that the set of classifiers may define document classification rules for a classification model. The computing device may receive the first set of documents in various ways, such as within emails or messages, uploads, and/or file transfers. In some instances, the computing device may use a scanning process to receive one or more documents.

Block 904 of method 900 may involve training the classification model using a machine learning technique. Particularly, the machine learning technique may assign each document of a second set of documents to a particular destination of a group of destinations (e.g., folders) based on the document classification rules defined by the classifiers.

In some examples, training the classification model using the machine learning technique may involve determining a structure of a given document of the second set of documents, identifying a destination defined by a particular classifier such that the destination includes documents that have respective structures similar to the structure of the given document, and assigning the given document to the identified destination. In additional examples, training the classification model using the machine learning technique may involve determining metadata of a given document of the second set of documents, identifying a destination defined by a particular classifier such that the destination includes documents that have respective metadata similar to the metadata of the given document, and assigning the given document to the identified destination. In further examples, the computing device may use a combination of metadata and structure of documents to train the classification model using machine learning.

Block 906 of method 900 may involve receiving a template design for each destination of the group of destinations. Each template design (e.g., an OCR template) may specify metadata to extract for a document type corresponding to documents assigned to a destination.

Block 908 of method 900 may involve subsequently classifying a particular document using the classification model. Classifying the particular document may involve one or both of assigning the particular document to a given destination based on the document classification rules and exporting at least some metadata form the particular document using the template design associated with the given destination.

In some examples, the computing device may assign the particular document to an unclassified folder and provide a notification that indicates the particular document was assigned to the unclassified folder. The notification may include a link that enables manual classification of the particular document by a user. As such, the computing device may receive manual classification of the particular document and subsequently train the classification model using the manual classification of the particular document such that the classification model classifies documents similar to the particular document based on the manual classification.

In some examples, the computing device may obtain information associated with a source of the particular document from a database based on metadata extracted from the particular document using the template design associated with the given destination. For instance, the computing device may obtain information associated with a vendor in response to classifying the particular document using the classification model.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    receiving, at a computing device and from a user interface, a set of inputs, wherein each input assigns a document of a first set of documents to a classifier of a set of classifiers such that the set of classifiers define document classification rules for a classification model;
    training, by the computing device, the classification model using a machine learning technique that assigns each document of a second set of documents to a particular destination of a plurality of destinations based on the document classification rules;
    receiving, at the computing device, a template design for each destination of the plurality of destinations, wherein each template design specifies metadata to extract for a document type corresponding to documents assigned to a destination;

subsequently classifying a particular document using the classification model, wherein classifying the particular document involves: (i) assigning the particular document to a given destination of the plurality of destinations based on the document classification rules, (ii) exporting at least some metadata from the particular document using the template design associated with the given destination, and (iii) obtaining additional information using content of extracted metadata to supplement the exported metadata;

determining an accuracy rate based on at least manual validation received from a user or automatic validation based on predefined rules; and providing a notification to the user in response to a determination that the accuracy rate is below a threshold accuracy rate.

2. The method of claim 1, further comprising:
receiving the first set of documents via one or more electronic messages and one or more uploads.

3. The method of claim 2, wherein the computing device is a printing device, and
wherein receiving the first set of documents further comprises receiving at least one document of the first set of documents using a scanning process.

4. The method of claim 1, wherein training the classification model using the machine learning technique comprises:
determining a structure of a given document of the second set of documents by analyzing an arrangement of metadata in the given document without using text recognition;
identifying a destination defined by a particular classifier such that the destination includes documents that have respective structures similar to the structure of the given document; and
assigning the given document to the identified destination.

5. The method of claim 1, wherein training the classification model using the machine learning technique comprises:
determining metadata of a given document of the second set of documents;
identifying a destination defined by a particular classifier such that the destination includes documents that have respective metadata similar to the metadata of the given document; and
assigning the given document to the identified destination.

6. The method of claim 1, wherein subsequently classifying a particular document using the classification model comprises:
assigning the particular document to an unclassified folder; and
providing a notification that indicates the particular document was assigned to the unclassified folder.

7. The method of claim 6, wherein providing the notification that indicates the particular document was routed to the unclassified folder further comprises:
providing a link with the notification that enables manual classification of the particular document.

8. The method of claim 7, further comprising:
receiving manual classification of the particular document; and
subsequently training the classification model using the manual classification of the particular document such that the classification model classifies documents similar to the particular document based on the manual classification.

9. The method of claim 1, further comprising:
responsive to subsequently classifying the particular document using the classification model, obtaining information associated with a source of the particular document from a database based on metadata extracted from the particular document using the template design associated with the given destination.

10. A system comprising:
a user interface;
a computing device configured to:
receive, from the user interface, a set of inputs, wherein each input assigns a document of a first set of documents to a classifier of a set of classifiers such that the set of classifiers define document classification rules for a classification model;
train the classification model using a machine learning technique that assigns each document of a second set of documents to a particular destination of a plurality of destinations based on the document classification rules;
receive a template design for each destination of the plurality of destinations, wherein each template design specifies metadata to extract for a document type corresponding to documents assigned to a destination;
subsequently classify a particular document using the classification model, wherein classifying the particular document involves: (i) assigning the particular document to a given destination of the plurality of destinations based on the document classification rules, (ii) exporting at least some metadata from the particular document using the template design associated with the given destination, and (iii) obtaining additional information using content of extracted metadata to supplement the exported metadata;
determine an accuracy rate based on at least manual validation received from a user or automatic validation based on predefined rules; and
provide a notification to the user in response to a determination that the accuracy rate is below a threshold accuracy rate.

11. The system of claim 10, wherein the computing device is further configured to:
responsive to training the classification model using the machine learning technique, providing the classification model to a second computing device, wherein the second computing device is configured to execute the classification model.

12. The system of claim 10, wherein each destination of the plurality of destinations corresponds to a folder for storing documents.

13. The system of claim 10, wherein the computing device is a printing device comprising a scanner for scanning documents.

14. The system of claim 10, wherein the computing device is configured to train the classification model using the machine learning technique to:
determine a structure of a given document of the second set of documents by analyzing an arrangement of metadata in the given document without using text recognition;

identify a destination defined by a particular classifier such that the destination includes documents that have respective structures similar to the structure of the given document; and assign the given document to the identified destination.

15. The system of claim 10, wherein the computing device is configured to train the classification model using the machine learning technique to:

determine metadata of a given document of the second set of documents;

identify a destination defined by a particular classifier such that the destination includes documents that have respective metadata similar to the metadata of the given document; and assign the given document to the identified destination.

16. The system of claim 10, wherein the computing device is configured to subsequently classify the particular document using the classification model via assigning the particular document to a destination associated with unclassified documents; and provide a notification that indicates the particular document was unclassified.

17. The system of claim 16, wherein the notification includes a link that enables manual classification of the particular document.

18. The system of claim 17, wherein the computing device is further configured to:

receive manual classification of the particular document; and subsequently train the classification model using the manual classification of the particular document such that the classification model classifies documents similar to the particular document based on the manual classification.

19. The system of claim 10, wherein the computing device is further configured to obtain information associated with a source of the particular document from a database based on metadata extracted from the particular document using the template design associated with the given destination.

20. An article of manufacture comprising non-transitory data storage storing at least computer-readable instructions that, when executed by one or more processors of a computing device, cause the computing device to perform tasks comprising:

receiving, from a user interface, a set of inputs, wherein each input assigns a document of a first set of documents to a classifier of a set of classifiers such that the set of classifiers define document classification rules for a classification model;

training the classification model using a machine learning technique that assigns each document of a second set of documents to a particular destination of a plurality of destinations based on the document classification rules;

receiving a template design for each destination of the plurality of destinations, wherein each template design specifies metadata to extract for a document type corresponding to documents assigned to a destination;

subsequently classifying a particular document using the classification model, wherein classifying the particular document involves: (i) assigning the particular document to a given destination of the plurality of destinations based on the document classification rules, (ii) exporting at least some metadata from the particular document using the template design associated with the given destination, and (iii) obtaining additional information using content of extracted metadata to supplement the exported metadata;

determining an accuracy rate based on at least manual validation received from a user or automatic validation based on predefined rules; and providing a notification to the user in response to a determination that the accuracy rate is below a threshold accuracy rate.

* * * * *